(12) United States Patent
Barbir et al.

(10) Patent No.: US 8,731,793 B2
(45) Date of Patent: May 20, 2014

(54) CLUTCH TEMPERATURE ESTIMATION FOR A MOBILE MACHINE

(75) Inventors: Mirko V. Barbir, Naperville, IL (US); Stacy Linn Grove, Washington, IL (US); Yun Liu, Peoria, IL (US); Gerry Owen McCann, Dunlap, IL (US); John Dewey Gates, Oswego, IL (US)

(73) Assignee: Caterpillar Inc., Peoria, IL (US)

( * ) Notice: Subject to any disclaimer, the term of this patent is extended or adjusted under 35 U.S.C. 154(b) by 575 days.

(21) Appl. No.: 12/980,481

(22) Filed: Dec. 29, 2010

(65) Prior Publication Data

US 2012/0173103 A1    Jul. 5, 2012

(51) Int. Cl.
 F16D 43/25    (2006.01)
 F16D 25/00    (2006.01)
(52) U.S. Cl.
 USPC ............... 701/67; 701/68; 701/51; 701/58; 477/34; 477/70; 477/76; 477/97; 477/98; 477/166; 477/174
(58) Field of Classification Search
 USPC .......... 701/51, 58, 67, 68; 477/34, 70, 76, 79, 477/83, 86, 90, 97, 98, 166, 174
 See application file for complete search history.

(56) References Cited

U.S. PATENT DOCUMENTS

| | | | |
|---|---|---|---|
| 4,019,614 A * | 4/1977 | Prenzel et al. | 192/103 F |
| 4,576,263 A * | 3/1986 | Lane et al. | 477/72 |
| 5,337,866 A | 8/1994 | Sturmer et al. | |
| 5,505,100 A | 4/1996 | Mitchell et al. | |
| 5,823,912 A | 10/1998 | Fischer et al. | |
| 6,152,275 A | 11/2000 | Fischer et al. | |
| 6,482,123 B2 * | 11/2002 | Steeby | 477/98 |
| 6,580,994 B2 | 6/2003 | Katayama et al. | |
| 6,769,526 B2 | 8/2004 | Iida et al. | |
| 7,217,223 B2 | 5/2007 | Saeki et al. | |
| 7,314,429 B2 | 1/2008 | Reibold et al. | |
| 7,421,326 B2 | 9/2008 | Thor et al. | |
| 7,686,112 B2 | 3/2010 | Shiiba | |
| 7,708,095 B2 | 5/2010 | Hirata | |
| 2004/0034460 A1 | 2/2004 | Folkerts et al. | |
| 2009/0265068 A1 | 10/2009 | Kamioka et al. | |
| 2009/0276129 A1 * | 11/2009 | Hwang et al. | 701/68 |
| 2009/0318265 A1 | 12/2009 | Ginther | |
| 2010/0121542 A1 | 5/2010 | Tsukamoto et al. | |

* cited by examiner

Primary Examiner — Adam Tissot
(74) Attorney, Agent, or Firm — Finnegan, Henderson, Farabow, Garrett & Dunner LLP

(57) ABSTRACT

A mobile machine includes a propulsion system. The propulsion system may include a prime mover, a traction device, and a clutch operable to transmit power produced by the prime mover to the traction device. The propulsion system may also include propulsion-system controls operable to control the clutch. The propulsion-system controls may include at least one information processor configured to estimate a temperature of the clutch based at least in part on an estimated slippage of the clutch and a fluid temperature.

20 Claims, 2 Drawing Sheets

CLUTCH TEMPERATURE ESTIMATION FOR A MOBILE MACHINE

TECHNICAL FIELD

The present disclosure relates to mobile machines and, more particularly, mobile machines that use one or more clutches.

BACKGROUND

Mobile machines typically have a propulsion system for propelling them. The propulsion system of a mobile machine may include one or more traction devices (such as wheels), a prime mover (such as an engine), and components for transmitting power from the prime mover to the one or more traction devices to propel the mobile machine. In some propulsion systems the components for transmitting power from the prime mover to the one or more traction devices include one or more clutches. These clutches can be slipped to modulate the transmission of power between the components of the propulsion system for various purposes, such as for starting movement of the mobile machine and/or controlling distribution of power to the traction devices of the mobile machine as part of a traction control strategy. Unfortunately, slipping these clutches can generate significant heat, which can sometimes heat the clutches and/or other components to undesirably high temperatures.

U.S. Pat. No. 6,769,526 B2 to Iida et al. ("the '526 patent") discloses a system for estimating the temperature of a clutch in a four-wheel-drive system. To estimate the temperature of the clutch, the system of the '526 patent estimates an amount of slippage of the clutch and an amount of torque transmitted by the clutch. Using these estimates, the system of the '526 patent estimates an amount of energy generated by the slippage of the clutch. To estimate whether the temperature of the clutch has increased, the system of the '526 patent compares the estimated value of the energy generated by the slippage of the clutch to a predetermined fixed value representative of an estimate of the amount of energy that may be typically rejected by the clutch.

Although the '526 patent discloses a system for estimating temperature increases of a clutch in a four-wheel-drive system, the system of the '526 patent may have certain shortcomings. For example, the approach of using a fixed value of assumed heat rejection rate to determine whether the clutch temperature has increased or decreased may estimate clutch temperatures with a level of accuracy that is undesirably low.

The disclosed embodiments solve one or more of the problems set forth above.

SUMMARY

One disclosed embodiment relates to a mobile machine having a propulsion system. The propulsion system may include a prime mover, a traction device, and a clutch operable to transmit power produced by the prime mover to the traction device. The propulsion system may also include propulsion-system controls operable to control the clutch. The propulsion-system controls may include at least one information processor configured to estimate a temperature of the clutch based at least in part on an estimated slippage of the clutch and a fluid temperature.

Another embodiment relates to a method of operating a mobile machine. The method may include producing power with a prime mover. The method may also include transmitting power from the prime mover to a traction device to propel the mobile machine, which may include controlling a clutch to transmit power produced by the prime mover to the traction device. The method may also include estimating with at least one information processor of the mobile machine a temperature of the clutch, which may include estimating the temperature based at least in part on an estimated slippage of the clutch and a fluid temperature.

A further disclosed embodiment relates to a mobile machine having a propulsion system configured to propel the mobile machine. The propulsion system may include a prime mover, at least one front traction device, at least one rear traction device, and a power-transfer system configured to transmit power from the prime mover to the at least one front traction device and the at least one rear traction device. The power-transfer system may include a clutch. The propulsion-system may also include propulsion-system controls configured to control the clutch to control a distribution between power transmitted to the at least one front traction device and power transmitted to the at least one rear traction device. The propulsion-system controls may include at least one information processor operable to estimate a temperature of the clutch. Additionally, the propulsion-system controls may be configured to fully engage the clutch in response to the estimated temperature of the clutch exceeding a reference value.

DETAILED DESCRIPTION

Figure 1:
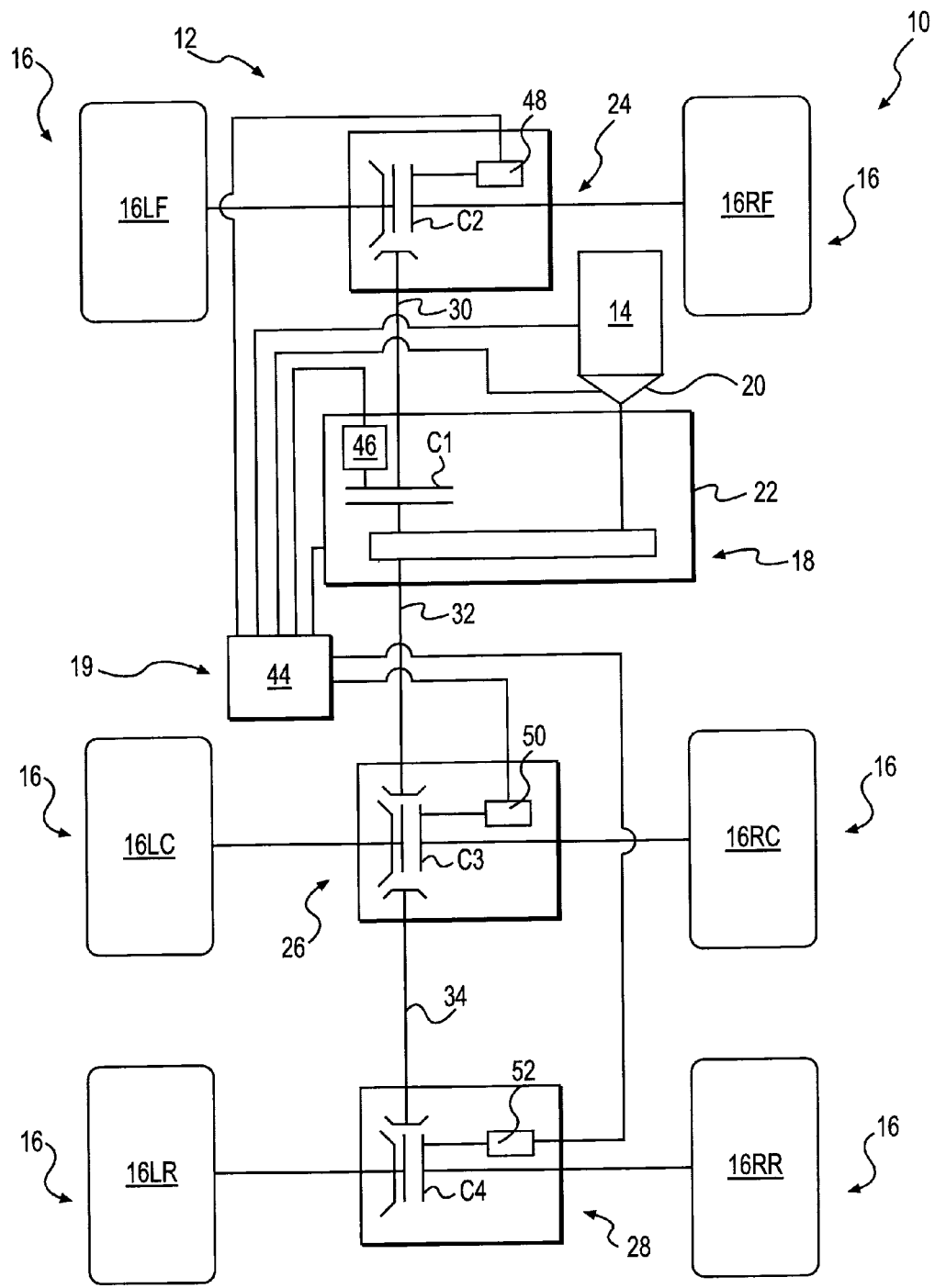
FIG. 1 is a schematic illustration of a mobile machine according to one embodiment of the present disclosure.

FIG. 1 illustrates a mobile machine 10 according to the present disclosure. Mobile machine 10 may include a propulsion system 12 configured to propel mobile machine 10. Mobile machine 10 may be configured to perform a variety of tasks. For example, mobile machine 10 may be configured to transport or move people, goods, or other matter or objects. Additionally, or alternatively, mobile machine 10 may be configured to perform a variety of other operations associated with a commercial or industrial pursuit, such as mining, construction, energy exploration and/or generation, manufacturing, transportation, and agriculture.

Propulsion system 12 may include a prime mover 14, traction devices 16, a power-transfer system 18, and propulsion-system controls 19. Prime mover 14 may include any type of component or components operable to provide power to propel mobile machine 10. For example, in some embodiments, prime mover 14 may include an engine, such as a diesel engine, a gasoline engine, a gaseous-fuel-powered engine, or a gas turbine engine. Additionally, or alternatively, prime mover 14 may include one or more motors, such as one or more electric motors and/or one or more hydraulic motors.

Traction devices 16 may include any types of devices operable to receive power produced by prime mover 14 and propel mobile machine 10 by transmitting that power to the terrain underlying mobile machine 10. For example, in some embodiments, each of traction devices 16 may be a wheel. Alternatively, traction devices 16 may include one or more track units or other types of components configured to propel mobile machine 10. Propulsion system 12 may include any suitable number and/or arrangement of traction devices 16. For example, as FIG. 1 shows, the traction devices 16 of propulsion system 12 may include a right front traction device 16RF, a left front traction device 16LF, a right rear traction device 16RR, a left rear traction device 16LR, a right center traction device 16RC, and a left center traction device 16LC.

Power-transfer system 18 may include any components operable to transmit power between prime mover 14 and traction devices 16. For example, as FIG. 1 shows, power-transfer system 18 may include a transmission 20, a transfer case 22, a front axle 24, a rear axle 28, a center axle 26, and drive shafts 30, 32, and 34. Transmission 20 may be configured to transmit power from prime mover 14 to transfer case 22. Additionally, transmission 20 may be configured to provide a number of optional drive ratios between prime mover 14 and transfer case 22, including a finite number of drive ratios or a continuously variable range of drive ratios. Transfer case 22 may be configured to transmit power received from prime mover 14 and transmission 20 to drive shafts 30 and 32. Drive shaft 30 may be connected to transmit power from transfer case 22 to front axle 24, and front axle 24 may be configured to transmit power to right front traction device 16RF and left front traction device 16LF. Similarly, drive shaft 32 may be connected to transmit power from transfer case 22 to center axle 26, and center axle 26 may be configured to transmit power from driveshaft 32 to right center traction device 16RC and left center traction device 16LC. Drive shaft 34 may similarly be connected to transmit power from center axle 26 to rear axle 28, and rear axle 28 may be configured to transmit power from driveshaft 34 to right rear traction device 16RR and left rear traction device 16LR.

Power-transfer system 18 may also include one or more clutches for controlling the transmission of power between prime mover 14 and traction devices 16. For example, as FIG. 1 shows, power-transfer system 18 may include clutches C1, C2, C3, and C4. Clutch C1 may be connected between drive shafts 30 and 32, such that clutch C1 may be operated to control the distribution between power transmitted to the front traction devices 16RF, 16LF and power transmitted to the center and rear traction devices 16RC, 16LC, 16RR, 16LR. Clutch C1 may, for example, be included in transfer case 22. Each of clutches C2, C3, C4 may be connected between one right traction device 16RF, 16RC, 16RR and one left traction device 16LF, 16LC, 16LR, such that each clutch C2, C3, C4 is operable to control the distribution of power between the right and left traction devices it connects. In some embodiments, each clutch C2, C3, C4 may be included within one of axles 24, 26, 28.

Propulsion-system controls 19 may include any components operable to monitor and control propulsion system 12 in the manners discussed below. In some embodiments, propulsion-system controls 19 may include an information processor 44 operably connected to various sources of information and various control components, such that information processor 44 may monitor and control various aspects of the operation of mobile machine 10. Information processor 44 may include any components operable to receive and process information. In some embodiments, information processor 44 may include one or more microprocessors (not shown) and/or one or more memory devices (not shown). Information processor 44 may be operatively connected to prime mover 14, transmission 20, and transfer case 22 in such a manner to allow information processor 44 to monitor and/or control various aspects of the operation of these components.

Additionally, propulsion-system controls 19 may include clutch control units 46, 48, 50, and 52 associated with clutches C1, C2, C3, and C4, respectively. Clutch control units 46, 48, 50, and 52 may be operably connected to information processor 44 in a manner allowing information processor 44 to monitor and/or control various aspects of the operation of clutch control units 46, 48, 50, and 52 and clutches C1, C2, C3, and C4. Each clutch control unit 46, 48, 50, 52 may include any components operable to control actuation of the associated clutch C1, C2, C3, C4 under the control of information processor 44. In some embodiments, clutch control units 46, 48, 50, 52 may use hydraulic fluid from a hydraulic system (not shown) of mobile machine 10 to control clutches C1, C2, C3, C4. For example, each clutch control unit 46, 48, 50, 52 may include a hydraulic actuator (not shown) connected to the clutch C1, C2, C3, C4 and a control valve (not shown) for controlling the supply of hydraulic fluid to the hydraulic actuator to actuate the clutch C1, C2, C3, C4. In such embodiments, the control valve of each clutch control unit 46, 48, 50, 52 may be an electrically controlled solenoid valve, and information processor 44 may be configured to send an electric control signal to the solenoid valve to control the associated clutch C1, C2, C3, C4. Additionally, in such embodiments, information processor 44 may receive information about the pressure of hydraulic fluid supplied to each clutch control unit 46, 48, 50, 52.

Figure 2:
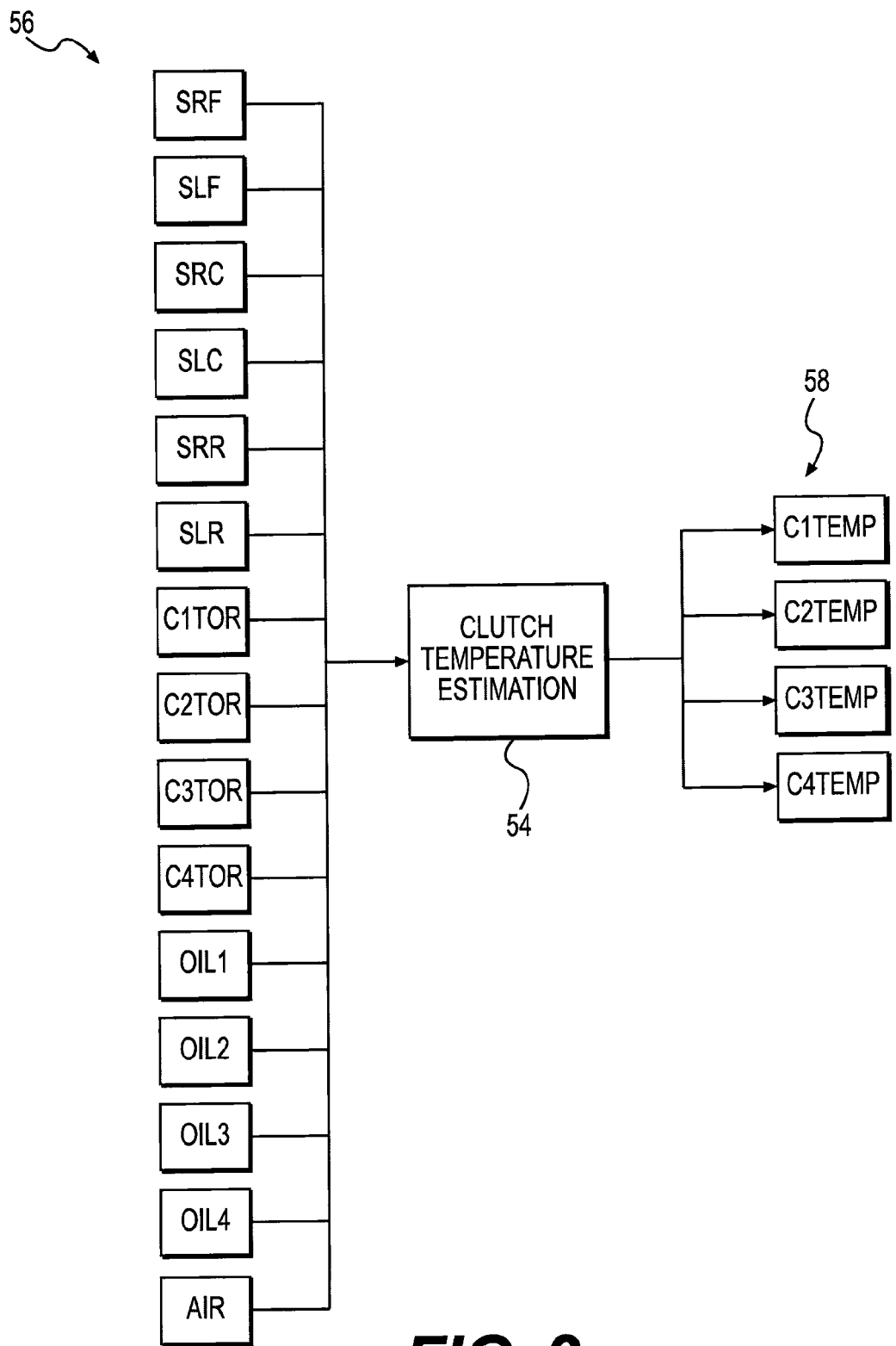
FIG. 2 is a block diagram of one embodiment of an clutch temperature estimation strategy according to the present disclosure.

Information processor 44 may be configured (i.e., programmed) to perform a variety of tasks associated with monitoring and/or controlling propulsion system 12. In some embodiments, information processor 44 may be configured to estimate a temperature of each of clutches C1, C2, C3, C4. For example, as FIG. 2 shows, information processor 44 may be programmed with a clutch temperature estimation module 54 configured to estimate a temperature of each of clutches C1, C2, C3, C4. Clutch temperature estimation module 54 may have a number of inputs 56 and a number of outputs 58. The outputs 58 may include an estimate C1TEMP of a temperature of clutch C1, an estimate C2TEMP of a temperature of clutch C2, an estimate C3TEMP of a temperature of clutch C3, and an estimate C4TEMP of a temperature of clutch C4.

The inputs 56 of clutch temperature estimation module 54 may include sensed values, estimated values, control signals generated by information processor 44, and various other information. As FIG. 2 shows, in some embodiments, the inputs to the clutch temperature estimation module 54 may include a speed value SRF of right front traction device 16RF, a speed value SLF of left front traction device 16LF, a speed value SRC of right center traction device 16RC, a speed value SLC of left center traction device 16LC, a speed value SRR of right rear traction device 16RR, and a speed value SLR of left rear traction device 16LR. These speed values may be gathered in various ways. In some embodiments, information processor 44 may receive these speed values of traction devices 16 from sensors (not shown) configured to sense a rotational speed of each of traction devices 16.

The inputs 56 to clutch temperature estimation module 54 may also include inputs C1TOR, C2TOR, C3TOR, and C4TOR indicative of an amount of torque transmitted through each of clutches C1, C2, C3, and C4, respectively. The clutch torque values may be determined in any suitable manner. In some embodiments, each clutch torque value C1TOR, C2TOR, C3TOR, and C4TOR may be estimated by propulsion-system controls 19 based on one or more sensor or control signals. For example, information processor 44 may estimate clutch torque value C1TOR based at least in part on the value of a control signal that information processor 44 sends to clutch control unit 46 associated with clutch C1. The value of the control signal sent to the clutch control unit 46 may be proportional to the torque transmitted by clutch C1 because the clutch control unit 46 may engage clutch C1 with an amount of force proportional to the value of the control signal. Information processor 44 may similarly estimate the clutch torque values C2TOR, C3TOR, and C4TOR associated with clutches C2, C3, and C4 based at least in part on the values of the control signals sent to clutch control units 48, 50, and 52. Information processor 44 may refine these estimates of the torque C1TOR, C2TOR, C3TOR, and C4TOR transmitted by clutches C1, C2, C3, and C4 with information about the pressure of hydraulic fluid supplied to clutch control units 46, 48, 50, and 52, which may also affect the actuation force of each of clutches C1, C2, C3, and C4.

The inputs 56 to the clutch temperature estimation module 54 may also include values of one or more fluid temperatures. For example, clutch temperature estimation module 54 may receive an oil temperature value OIL1, which may be a temperature of oil in which clutch C1 operates. Similarly, clutch temperature estimation module 54 may receive oil temperature values OIL2, OIL3, and OIL4, which may be temperatures of oil in which each of clutches C2, C3, and C4 operate, respectively.

These temperature values may be gathered in various ways. For example, in some embodiments, oil temperature value OIL1 may be sensed by a temperature sensor (not shown) in contact with the oil in which clutch C1 operates. Additionally, in some embodiments, one or more of oil temperatures OIL1, OIL2, OIL3, OIL4 may be estimated based on various other factors. For example, in embodiments where oil temperature OIL1 is sensed, oil temperatures OIL2, OIL3, OIL4 may be estimated based at least in part on the oil temperature OIL1. This may involve, for instance, assuming one or more of OIL2, OIL3, and OIL4 to be the same temperature as OIL1. In some embodiments, this may provide a conservative estimate of OIL2, OIL3, and OIL4, as the oil temperature OIL1 of the oil in which clutch C1 operates may generally be higher than the oil temperatures OIL2, OIL3, and OIL4 of the oil in which clutches C2, C3, and C4 operate. Alternatively one or more of the oil temperatures OIL2, OIL3, OIL4 may be estimated by adding a constant temperature to the oil temperature OIL1 or by multiplying the oil temperature OIL1 by a scaling factor. Any one of the oil temperatures OIL1, OIL2, OIL3, and OIL4 may be estimated based at least in part on one or more of the other oil temperatures OIL1, OIL2, OIL3, and OIL4.

Additionally, one or more of the oil temperatures OIL1, OIL2, OIL3, and OIL4 may be estimated based at least in part on factors other than the other oil temperatures OIL1, OIL2, OIL3, and OIL4. For example, one or more of the oil temperatures OIL1, OIL2, OIL3, and OIL4 may be estimated based at least in part on a running time of propulsion system 12 (i.e., an amount of time that propulsion system 12 has been operating to propel mobile machine 10). In some embodiments, propulsion-system controls 19 may determine one or more of the oil temperatures OIL1, OIL2, OIL3, and OIL4 based at least in part on one or more sensed temperatures in combination with other factors like the running time of propulsion system 12.

Additionally, in some embodiments, the values of one or more of oil temperatures OIL1, OIL2, OIL3, and OIL4 may be determined based at least in part on one or more assumed values. Similarly, in some embodiments, one or more of the oil temperatures OIL1, OIL2, OIL3, and OIL4 may be assumed values. In some embodiments where one or more of the oil temperatures OIL1, OIL2, OIL3, and OIL4 are assumed or based on assumed values, the assumed values may be conservative values. For example, one or more of the oil temperatures OIL1, OIL2, OIL3, and OIL4 and/or one or more of the values on which they are based may be assumed "worst case" values, i.e., values reflective of a maximum anticipated temperature.

Alternatively, in some embodiments, each of the oil temperature values OIL1, OIL2, OIL3, and OIL4 may be sensed values. In such embodiments, propulsion-system controls 19 may include temperature sensors (not shown) that sense the temperature of the oil in which each of clutches C1, C2, C3, and C4 operate.

Clutch temperature estimation module 54 may also receive an air temperature value AIR. This value may also be gathered in various ways. In some embodiments, the air temperature value AIR may be sensed by a sensor (not shown) configured to sense the temperature of ambient air that prime mover 14 intakes.

Based on inputs 56, clutch temperature estimation module 54 may use various approaches to generate the estimated temperatures C1TEMP, C2TEMP, C3TEMP, and C4TEMP of clutches C1, C2, C3, C4. Details of some exemplary approaches that propulsion-system control 19 may use in clutch temperature estimation module will be discussed in greater detail below.

Mobile machine 10, propulsion system 12, propulsion-system controls 19, and clutch temperature estimation module 54 are not limited to the configurations and operation discussed above and shown in FIGS. 1 and 2. For example, propulsion-system controls 19 may gather inputs 56 for clutch temperature estimation module 54 in manners other than those discussed above. Additionally, the inputs 56 and outputs 58 of clutch-temperature estimation module 54 may include information other than that shown in FIG. 2 and/or omit some of the information shown in FIG. 2. Additionally, power-transfer system 18 may include different numbers and arrangements of clutches and other components than shown in FIG. 1. Similarly, propulsion system 12 may include different numbers and/or arrangements of traction devices 16 than shown in FIG. 1.

INDUSTRIAL APPLICABILITY

The disclosed embodiments may have use in any application where it may prove beneficial to control transmission of power in a propulsion system of a mobile machine at least in part with clutches. During propulsion of mobile machine 10 by propulsion system 12, propulsion-system controls 19 may control clutches C1, C2, C3, C4 in various ways to provide various benefits. For example, in some embodiments, propulsion-system controls 19 may control clutches C1, C2, C3, and C4 as part of a traction-control system for biasing transmission of power to those traction devices 16 that have the best traction. This may involve propulsion-system controls 19 modulating (i.e., slipping) clutch C1 to control the distribution between power transmitted to the front traction devices 16RF, 16LF and power transmitted to the center and rear traction devices 16RC, 16LC, 16RR, and 16RL. Simultaneously, propulsion-system controls 19 may modulate (i.e., slip) clutches C2, C3, and C4 to control the distribution between power transmitted to the right-side traction devices 16RF, 16RC, 16RR and power transmitted to the left-side traction devices 16LF, 16LC, 16LR.

The slippage of clutches C1, C2, C3, and C4 during such operation may generate significant heat. This may tend to increase the temperature of clutches C1, C2, C3, and C4. If the temperature of any of clutches C1, C2, C3, and C4 climbs too high, such overheating may cause damage to the clutches C1, C2, C3, and C4 themselves and/or to other components of propulsion system 12. Propulsion-system controls 19 may monitor for any such overheating by monitoring the temperatures of clutches C1, C2, C3, and C4. For example, information processor 44 may use the inputs 56 and clutch temperature estimation module 54 shown in FIG. 2 to determine estimated temperatures C1TEMP, C2TEMP, C3TEMP, and C4TEMP for each of clutches C1, C2, C3, and C4.

The clutch temperature estimation module may implement various approaches for determining the temperatures of clutches C1, C2, C3, and C4. In some embodiments, propulsion-system controls 19 may estimate an initial value C1TEMP$_I$, C2TEMP$_I$, C3TEMP$_I$, and C4TEMP$_I$ for each clutch C1, C2, C3, and C4, which may be a temperature of each clutch C1, C2, C3, and C4 when propulsion system 12 has been inactive for an extended period of time. In some embodiments, propulsion-system controls 19 may assume that the initial temperatures C1TEMP$_I$, C2TEMP$_I$, C3TEMP$_I$, and C4TEMP$_I$ of clutches C1, C2, C3, and C4 are the same as the temperatures OIL1, OIL2, OIL3, and OIL4 of the oil in which each of clutches C1, C2, C3, C4 operate.

After propulsion system 12 begins propelling mobile machine 10, propulsion-system controls 19 may periodically redetermine the temperatures C1TEMP, C2TEMP, C3TEMP, and C4TEMP of clutches C1, C2, C3 and C4 based on various operating parameters. For example, propulsion-system controls 19 may estimate how much the temperatures C1TEMP, C2TEMP, C3TEMP, and C4TEMP of clutches C1, C2, C3, and C4 has increased or decreased after a period of time Δt.

Propulsion-system controls 19 may use various approaches for estimating the amount of increase or decrease in clutch temperatures C1TEMP, C2TEMP, C3TEMP, and C4TEMP over the interval Δt. In some embodiments, this may include determining a clutch slippage value for each clutch C1, C2, C3, and C4. The clutch slippage value for a clutch may represent a difference in speed between the two sides of the clutch, expressed either in terms of rotational speed of the two sides of the clutch or linear speed of the surfaces of the two sides of the clutch. Propulsion-system controls 19 may use various approaches to determine a clutch slippage value for any of clutches C1, C2, C3, and C4. In some embodiments, propulsion-system controls 19 may determine the slippage value for a given clutch C1, C2, C3, and C4 based on the speeds of one or more of traction devices 16 and known drive ratios in power-transfer system 18. For example, propulsion-system controls 19 may use the following equation to determine a clutch slippage value SLPC1 for clutch C1:

$$SLPC1 = \text{Abs}[(K1*(SRC+SLC))-(K2*(SRF+SLF))]$$

Where, K1 and K2 are constants related to known drive ratios in power-transfer system 18, and SRC, SLC, SRF, and SLF are speeds of traction devices 16RC, 16LC, 16RF, and 16LF, respectively. Propulsion-system controls 19 may use similar equations to determine the slippage values for each of clutches C2, C3, and C4 based on the speeds of one or more traction devices 16 and known drive ratios of power-transfer system 18.

Propulsion-system controls 18 may use the determined slippage value for each of clutches C1, C2, C3, and C4 in various ways in determining the temperature of each of clutches C1, C2, C3, and C4. In embodiments where the inputs to clutch temperature estimation module 54 include estimated values of torque C1TOR, C2TOR, C3TOR, and C4TOR transmitted by each of clutches, C1, C2, C3, and C4, propulsion-system controls 19 may use the estimated torque values in combination with the slippage values to determine a rate of heat generation for each clutch based on the determined torque and clutch slippage values. For example, propulsion-system controls 19 may determine a rate of heat generation HC1 in clutch C1 using the following equation:

$$HC1 = C1TOR*SLPC1*K3$$

Where, SLPC1 is the slippage value of clutch C1 already determined, C1TOR is the estimated value of torque transmitted by clutch C1, and K3 is a constant used for units conversion. Propulsion-system controls 19 may use similar equations to determine the rate of heat generation by each of clutches C2, C3, and C4 based on the amount of torque and slippage of each of these clutches.

With the estimated rate of heat generation for a given clutch C1, C2, C3, C4, propulsion-system controls 19 may determine the amount of heat energy generated by that clutch in the period Δt by multiplying the rate of heat generation by the amount of time elapsed. For example, propulsion-system controls 19 may estimate the amount of heat energy generated EGC1 by clutch C1 during the period Δt with the following equation:

$$EGC1 = HC1*\Delta t*K4$$

Where, HC1 is the rate of heat generation already determined and K4 is a constant related to the characteristics of clutch C1 (such as the number of clutch plates in clutch C1) and constant values used in the numerical integration of power. Propulsion-system controls 19 may determine the amount of energy generated in any of clutches C2, C3, and C4 during the time period Δt by using similar equations.

Having determined the amount of energy generated by a given clutch C1, C2, C3, C4 in the period Δt, propulsion-system controls 19 may use this information in various ways in estimating the amount by which the temperature of a given clutch C1, C2, C3, C4 has increased or decreased over the time period Δt. In some embodiments, propulsion-system controls 19 may estimate a net amount of energy absorbed by a given clutch C1, C2, C3, C4 and use that information in combination with known thermal properties of the clutch C1, C2, C3, C4 to determine an increase or decrease in the temperature of the clutch. For example, propulsion-system controls 19 may use the following equations to determine a change in the temperature of clutch C1 over the period Δt:

$$ENC1 = EGC1 - ERC1$$

$$\Delta TEMPC1 = ENC1*K5$$

Where, ENC1 is the net energy absorbed by clutch C1, EGC1 is the amount of energy generated by clutch C1, ERC1 is the amount of energy rejected by clutch C1 during the same period, ΔTEMPC1 is the change in temperature of the clutch C1 over the period, and K5 is a constant related to the thermal properties of clutch C1. Propulsion-system controls 19 may use similar equations to determine the change in temperature of any of clutches C2, C3, and C4 over a given period of time.

The amount of energy rejected by a given clutch C1, C2, C3, C4 over the time period Δt may be determined in various ways. In some embodiments, propulsion-system controls 19 may determine the net energy rejected by a clutch C1, C2, C3, C4 based at least in part on one or more fluid temperatures. For example, propulsion-system controls 19 may determine the amount of energy rejected ERC1 by clutch C1 based on the temperature OIL1 of the oil in which clutch C1 operates. The temperature OIL1 may affect the amount of energy rejected ERC1 because the difference in temperature between the clutch C1 and the oil in which it operates may affect how rapidly the clutch C1 rejects energy to the oil. In some embodiments, propulsion-system controls 19 may use an equation similar to the following to estimate the amount of energy rejected ERC1 by clutch C1 during a given period of time:

$$ERC1 = K6*(C1TEMP_I - OIL1)*\Delta t$$

Where, $C1TEMP_I$ is the previously estimated initial temperature of clutch C1, OIL1 is the temperature of the oil in which clutch C1 operates, and K6 is a constant related to the heat-transfer characteristics of the clutch C1 and the oil in which it operates. Propulsion-system controls 19 may use similar approaches to estimate an amount of heat rejected by each of clutches C2, C3, and C4. Propulsion-system controls 19 may also use an air temperature value AIR, such as a sensed ambient air temperature, in evaluating an amount of heat rejected by a clutch C1, C2, C3, C4. Propulsion-system controls 19 may use the air temperature value AIR in combination with the oil temperature OIL1, OIL2, OIL3, OIL4 to determine the amount of heat rejected by a clutch C1, C2, C3, C4. Alternatively, propulsion-system controls 19 may use the air temperature value AIR instead of the oil temperature value OIL1, OIL2, OIL3, OIL4. Propulsion-system controls 19 may do so, for example, in embodiments or circumstances where the oil temperature value OIL1, OIL2, OIL3, OIL4 is not available to propulsion-system controls 19.

With the estimated net energy absorbed by each clutch C1, C2, C3, and C4 during the time period Δt, propulsion-system controls 19 may estimate the amount by which the temperature of each clutch C1, C2, C3, and C4 increased during the time period Δt. For example, propulsion-system controls 19 may estimate the amount by which the temperature of clutch C1 increased or decreased during the time period Δt by using the following equation:

$$\Delta TEMPC1 = K7 * ENC1$$

Where, ΔTEMPC1 is the change in temperature of clutch C1, K7 is a constant related to the thermal properties of clutch C1, and ENC1 is the estimated net energy absorbed by the clutch C1 during the time period Δt. Propulsion-system controls 19 may use similar equations to determine the amount by which the temperature of each of clutches C2, C3, and C4 changed during the time period Δt.

With the estimated initial temperatures and estimated changes in the temperatures of clutches C1, C2, C3, and C4 over the time period Δt, propulsion-system controls 19 may estimate the temperature of each clutch at the end of the time period. For example, propulsion-system controls 19 may estimate the temperature of clutch C1 at the end of the time period Δt using the following equation:

$$C1TEMP = C1TEMP_I + \Delta TEMPC1$$

Where C1TEMP is the estimated temperature of clutch C1 at the end of the period Δt, $C1TEMP_I$ is the previously estimated initial temperature of clutch C1, and ATEMPC1 is the estimated change in the temperature of clutch C1 over the period Δt. Propulsion-system controls 19 may use similar equations to determine the temperature of each of clutches C2, C3, and C4 at the end of the period Δt.

Propulsion-system controls 19 may periodically redetermine the temperatures of clutches C1, C2, C3, C4. After propulsion-system controls 19 have estimated the temperatures of the clutches C1, C2, C3, C4 at the end of the first period Δt, propulsion-system controls 19 may redetermine the temperatures of clutches C1, C2, C3, C4 periodically, such as after each additional increment of time equal to Δt. To do so, after estimating the temperatures of each of clutches C1, C2, C3, C4 at the end of an interval Δt, propulsion-system controls 19 may reset the variables $C1TEMP_I$, $C2TEMP_I$, $C3TEMP_I$, and $C4TEMP_I$ to be equal to the most recently estimated value of the temperatures C1TEMP, C2TEMP, C3TEMP, and C4TEMP, followed by repeating the process discussed above.

As they repeatedly redetermine the temperatures of clutches C1, C2, C3, C4, propulsion-system controls 19 may also redetermine the various other sensed and estimated values used in the process. For example, propulsion-system controls 19 may redetermine the value of oil temperatures OIL1, OIL2, OIL3, OIL4 and the air temperature value AIR each time the clutch temperatures C1TEMP, C2TEMP, C3TEMP, and C4TEMP are redetermined. Tracking the actual values of these fluid temperatures and using them in the process of tracking the temperatures C1TEMP, C2TEMP, C3TEMP, and C4TEMP of clutches C1, C2, C3, and C4 may enhance the accuracy of the estimated clutch temperatures.

Propulsion-system controls 19 may use the estimated temperatures C1TEMP, C2TEMP, C3TEMP, and C4TEMP of clutches C1, C2, C3, and C4 in various ways. In some embodiments, propulsion-system controls 19 may monitor these values to detect if the temperature of any of clutches C1, C2, C3, and C4 is approaching and/or has exceeded desirable levels. Propulsion-system controls 19 may store this information in memory for later access by individuals who may have an interest in knowing the temperature histories of clutches C1, C2, C3, and C4.

Additionally, in some embodiments, propulsion-system controls 19 may respond to an undesirably high value of the temperature C1TEMP, C2TEMP, C3TEMP, C4TEMP of a clutch C1, C2, C3, C4 by taking measures to prevent additional heating of that clutch C1, C2, C3, C4. For example, if the estimated temperature C1TEMP, C2TEMP, C3TEMP, C4TEMP of a clutch C1, C2, C3, C4 rises above a reference value corresponding to an undesirable thermal state (e.g., one in which component damage may occur), propulsion-system controls 19 may take action to reduce the amount of heat generated in that clutch C1, C2, C3, C4 due to slippage. Propulsion-system controls 19 may do so by fully engaging the clutch C1, C2, C3, C4 to substantially eliminate its slippage, at least partially disengaging the clutch C1, C2, C3, C4 to reduce the amount of torque transmitted through it, or fully disengaging the clutch C1, C2, C3, C4 to substantially cease any torque transmission through it. Propulsion-system controls 19 may select which of these clutch-protection strategies to employ for a given clutch C1, C2, C3, C4 in a given set of circumstances based on various control algorithms.

In some embodiments, when the estimated temperature C1 TEMP of clutch C1 rises above a reference value indicative of an undesirable thermal condition, propulsion-system controls 19 may respond by fully engaging clutch C1 to prevent slippage of clutch C1. By doing so, propulsion-system controls 19 may protect clutch C1 while allowing full transmission of power to both the front traction devices 16RF, 16LF and the center and rear traction devices 16RC, 16LC, 16RR, 16LR. This may help propulsion system 12 provide power to any traction device 16 that has good traction on the terrain underlying mobile machine 10. After fully engaging the clutch in response to the estimated temperature C1 TEMP of clutch C1 rising above a reference value, propulsion-system controls 19 may continue to reevaluate the estimated temperature C1TEMP. If the estimated temperature C1TEMP continues to rise an undesirable amount (such as above another reference temperature value) after being fully engaged, propulsion-system controls 19 may then fully disengage clutch C1 to protect it.

The operation of propulsion system 12 and the manner in which propulsion-system controls 19 estimate and use the temperatures of clutches C1, C2, C3, and C4 are not limited to the examples provided above. For instance, propulsion-system controls 19 may use different inputs and equations than discussed above to estimate the temperatures of clutches C1, C2, C3, and C4. For instance, in estimating the temperatures C1TEMP, C2TEMP, C3TEMP, C4TEMP of clutches C1, C2, C3, C4, propulsion-system controls 19 may use fluid temperatures other than the oil temperatures OIL1, OIL2, OIL3, OIL4 and the air temperature AIR. The approach used by propulsion-system controls 19 to estimate the temperature of a clutch C1, C2, C3, C4 may be simpler in one or more respects and/or more complicated in one or more respects. For example, in estimating the temperature of a given clutch C1, C2, C3, C4, propulsion-system controls 19 may factor in additional variables, such as the amount of heat generated and/or rejected by certain subcomponents of the clutch, in addition to or instead of the amount of heat generated and/or rejected by the clutch C1, C2, C3, C4 to the oil within which the clutch operates. Similarly, propulsion-system controls 19 may estimate the temperatures of various subcomponents of each clutch C1, C2, C3, and C4, rather than just a general temperature for each clutch.

It will be apparent to those skilled in the art that various modifications and variations can be made in the disclosed systems and methods without departing from the scope of the disclosure. Other embodiments of the disclosed monitoring system will be apparent to those skilled in the art from consideration of the specification and practice of the systems and methods disclosed herein. It is intended that the specification and examples be considered as exemplary only, with a true scope of the disclosure being indicated by the following claims and their equivalents.

What is claimed is:

1. A mobile machine, comprising:
a propulsion system configured to propel the mobile machine, the propulsion system including
a prime mover;
a plurality of traction devices;
a clutch operable to transmit power produced by the prime mover to the plurality of traction devices; and
propulsion-system controls operable to control the clutch to control the distribution of power between the plurality of traction devices, the propulsion-system controls including at least one information processor configured to estimate a temperature of the clutch based at least in part on an estimated slippage of the clutch and a fluid temperature,
wherein the at least one information processor is configured to estimate the clutch slippage based at least in part on a speed of each of the plurality of traction devices and at least one known drive ratio.

2. The mobile machine of claim 1, wherein the fluid temperature is a temperature of a liquid in contact with the clutch.

3. The mobile machine of claim 1, wherein the fluid temperature is a sensed temperature of air.

4. The mobile machine of claim 1, wherein estimating the temperature of the clutch based at least in part on the estimated slippage of the clutch and the fluid temperature includes
estimating an amount of energy generated by the estimated clutch slippage,
estimating an amount of energy rejected from the clutch based at least in part on the fluid temperature, and
estimating the temperature of the clutch based on the amount of energy generated and the amount of energy rejected.

5. The mobile machine of claim 1, wherein estimating the amount of energy generated by the estimated clutch slippage includes estimating the amount of energy generated based at least in part on an estimated amount of torque transmitted by the clutch.

6. The mobile machine of claim 1, wherein the propulsion-system controls are operable to control the clutch based at least in part on the estimated temperature.

7. The mobile machine of claim 1, wherein the propulsion-system controls are configured to control the clutch to reduce slippage of the clutch in response to the estimated temperature of the clutch exceeding a reference value.

8. The mobile machine of claim 1, wherein the propulsion-system controls are configured to fully engage the clutch to reduce clutch slippage in response to the estimated temperature exceeding a reference value.

9. The mobile machine of claim 1, wherein the propulsion-system controls are configured to fully disengage the clutch to reduce heat generated in the clutch in response to the estimated temperature rising.

10. A method of operating a mobile machine, the method comprising:
producing power with a prime mover;
transmitting power from the prime mover to a plurality of traction devices to propel the mobile machine, including controlling a clutch to transmit power produced by the prime mover to the plurality of traction device and controlling the clutch to control the distribution of power between the plurality of traction devices; and
estimating with at least one information processor of the mobile machine a temperature of the clutch, including estimating the temperature based at least in part on an estimated slippage of the clutch and a fluid temperature,
wherein estimating the temperature of the clutch based at least in part on the estimated slippage of the clutch and the fluid temperature includes estimating the slippage of the clutch based at least in part on a speed of each of the plurality of traction devices and at least one known drive ratio.

11. The method of claim 10, wherein estimating the temperature of the clutch based at least in part on the estimated slippage of the clutch and the fluid temperature includes
estimating an amount of energy generated by the estimated clutch slippage,
estimating an amount of energy rejected from the clutch based at least in part on the fluid temperature, and
estimating the temperature of the clutch based on the amount of energy generated and the amount of energy rejected.

12. The method of claim 11, wherein estimating the amount of energy generated by the estimated clutch slippage includes estimating the amount of energy generated based at least in part on an estimated amount of torque transmitted by the clutch.

13. The method of claim 10, further including controlling the clutch to reduce energy generated in the clutch in response to the estimated temperature of the clutch exceeding a reference value.

14. The method of claim 10, further including fully engaging the clutch to reduce clutch slippage in response to the estimated temperature exceeding a reference value.

15. The method of claim 10, wherein the fluid temperature is a temperature of oil.

16. The method of claim 10, further including fully disengaging the clutch to reduce heat generated in the clutch in response to the estimated clutch temperature rising.

17. The mobile machine of claim 1, wherein the plurality of traction devices comprises at least one front traction device and at least one rear traction device and
wherein the propulsion-system controls are operable to fully engage the clutch in response to the estimated temperature of the clutch exceeding a reference value.

18. The mobile machine of claim 17, wherein the propulsion-system controls are further operable to, after fully engaging the clutch in response to the estimated temperature of the clutch exceeding the reference value, fully disengage the clutch if the estimated temperature of the clutch subsequently rises further to an undesired level.

19. The mobile machine of claim 5, wherein the estimated amount of torque transmitted by the clutch is based at least in part on information about the pressure of hydraulic fluid supplied to a clutch control unit.

20. The method of claim 12, wherein the estimated amount of torque transmitted by the clutch is based at least in part on information about the pressure of hydraulic fluid supplied to a clutch control unit.

\* \* \* \* \*